Feb. 18, 1958  C. J. LAWRENCE  2,823,730
COLLISION SEAT FOR VEHICLES
Filed Dec. 9, 1955
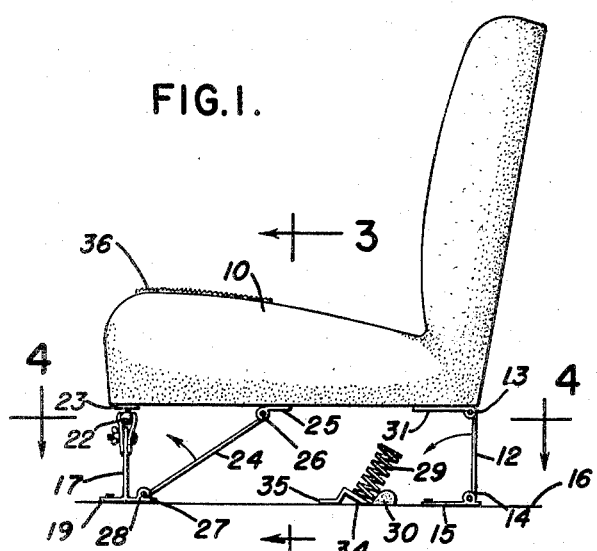
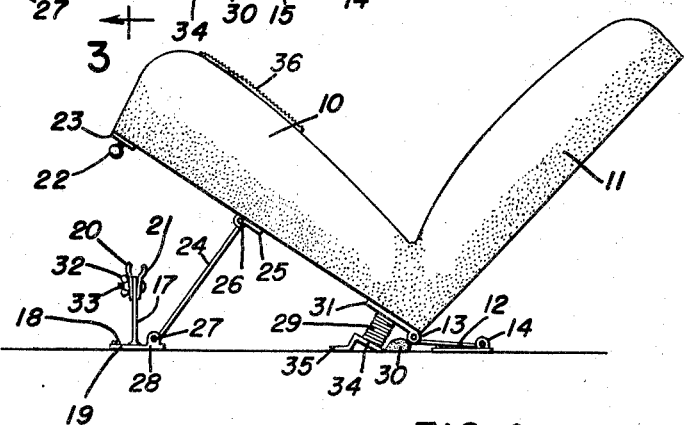
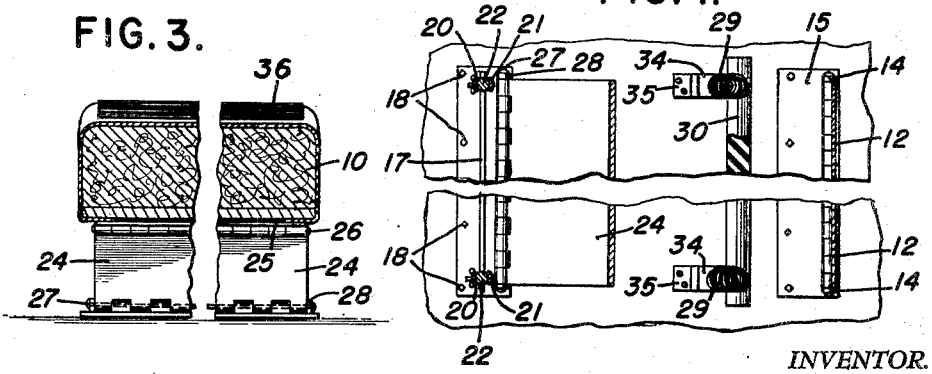
INVENTOR.
Clarence J. Lawrence
BY *Victor J. Evans & Co.*
ATTORNEYS United States Patent Office 2,823,730
Patented Feb. 18, 1958

2,823,730

COLLISION SEAT FOR VEHICLES

Clarence J. Lawrence, Washington, D. C.

Application December 9, 1955, Serial No. 552,026

5 Claims. (Cl. 155—9)

This invention relates to devices for preventing injury to operators and passengers of vehicles upon sudden stopping of the vehicle, such as in a collision or crash, and in particular a seat mounting wherein upon making a sudden stop the momentum carries the seat forwardly with the rear portion of the seat and back extended upwardly from the rear portion moving forwardly and downwardly and with the forward portion of the seat moving upwardly providing a blocking action and wherein the center of gravity of an occupant of a seat remains below the center of the blocking action and wherein friction material on the upper surface of the seat in combination with the blocking action prevents the occupant sliding or being thrown forwardly.

The purpose of this invention is to provide a collision or crash seat particularly for motor vehicles, airplanes, and the like wherein the seat is moved by momentum of the vehicle and halted with a resilient action whereby the extreme shock load of the seat coming to a sudden stop is obviated.

Various types of devices and particularly harness or straps have been used on vehicle seats to prevent passengers or operators of vehicles being injured by sudden stops; however, the actual position of the occupant in relation to the seat remains the same and as the seat comes to a sudden stop with the vehicle the severe shock load is transmitted directly to the occupant. With this thought in mind this invention contemplates a seat wherein with a vehicle in which the seat is positioned coming to a sudden stop the seat moves forwardly with a rolling action thereby absorbing the severe shock resulting from a crash, collision, or the like.

The object of this invention is, therefore, to provide means for mounting a seat in a vehicle whereby upon the vehicle coming to a sudden stop the seat travels forwardly in relation to the vehicle and gradually comes to a position of rest.

Another object of the invention is to provide means for mounting a seat in a vehicle whereby the seat continues to travel by momentum after the vehicle comes to a sudden stop in which the seat and the mounting thereof are adapted to be installed in vehicles now in use.

A further object of the invention is to provide an improved mounting for seats of vehicles wherein upon the vehicle arriving at a sudden stop the seat continues to move forwardly with a banking action protecting the occupant thereof from shock in which the seat is of a simple and economical construction.

With these and other objects and advantages in view the invention embodies a seat having a continuous support at the rear with the support hinged to the seat and also to a floor of a vehicle, a releasable support at the front which permits the forward edge of the seat to move forwardly and upwardly, an intermediate brace also hinged to the bottom of the seat and to the floor and mounted to cause the forward edge of the seat to travel upwardly as it is moved forwardly by momentum, and a plurality of springs positioned to break the forward movement of the seat.

Other features and advantages of the invention will appear from the following description taken in connection with the drawing, wherein:

Figure 1 is an end elevational view of the improved crash seat showing the seat in the normal position for use.

Figure 2 is a view similar to that shown in Fig. 1 showing the seat in the position of rest after a crash or collision wherein the center of gravity has moved forwardly with the seat and the forward edge of the seat moved upwardly and the rear edge and back downwardly.

Figure 3 is a longitudinal section through the seat taken on line 3—3 of Fig. 1 showing the relative positions of the parts.

Figure 4 is a sectional plan through the mounting elements of the seat taken on line 4—4 of Fig. 1.

Referring now to the drawing wherein like reference characters denote corresponding parts the improved crash or collision seat of this invention includes a seat 10 having a back 11, a vertically disposed plate 12 having a continuous hinge, such as a piano hinge 13 connecting the upper end to the lower surface of the seat 10 and a similar hinge 14 connecting the lower edge to a bearing 15 positioned on the floor, as indicated by the numeral 16, a plate 17 mounted on the floor with bolts 18 and a flange 19 and having spring clips 20 and 21 positioned to receive either mating balls 22 or a continuous rod, not shown, mounted on the lower surface of the forward edge of the seat with a base plate 23, a web 24 pivotally connected to a bearing 25 on the lower surface of the seat 10 with a continuous hinge 26 and also connected by a continuous hinge 27, at the opposite edge to a bearing 28 on the floor 16, and a plurality of springs 29 mounted in combination with a rubber bar 30 on base portions 34 of brackets and the springs are positioned to engage contact plates 31 on the lower surface of the seat 10.

The seat and back, which may be of any suitable pattern and of any suitable material are, therefore, supported by the plate 17 at the front and the plate 12 at the rear with the seat in the horizontal or normal position, and by the plate 24 and spring 29 with the seat in the position assumed after a crash, and in traveling from one position to another the momentum of the seat and also of a body in the seat causes the entire seat structure to move forwardly from the position shown in Fig. 1 wherein the plate 31 on the rear edge of the seat swings about the hinge 14 traveling forwardly and downwardly with the plate engaging the upper end of the spring 29 whereby the spring is compressed, taking the shock load and at the same time, upon forward movement of the seat the bearing plate 25 moves upwardly and forwardly about the center of the hinge 27 whereby the seat assumes the position shown in Fig. 2, the forward movement of the rear portion being restricted by the swinging plate 12 and spring 29.

The spring gripping fingers or jaws 20 and 21 are adapted to be adjusted by the wing nut 32 on a bolt 33 on the upper edge of the plate 17 and the ball 22 or rod, not shown, is adapted to snap into the fingers or jaws 20 and 21.

The forward end of the seat is adapted to be rigidly supported in the horizontal position for use with the forward edge secured by the ball 22 or rod, not shown, and held by the fingers or plates 20 and 21 and should the vehicle come to a sudden stop the rod is removed from the plates 20 and 21 traveling upwardly and being elevated by the plate 24 as the plate approaches the center.

By the same means momentum of the seat and a body of a person therein swings the plate 12 forwardly with the upper end moving about the center of the hinge 14 and, consequently, downwardly with the plate 31 striking the upper end of the spring 29.

The brackets in which the springs 29 are mounted are provided with an inclined base 34 with a flange 35 extended from the forward edge and the flange or other parts of the brackets are secured to the floor 16 with screws, or other fasteners. By this means the springs 29 are positioned to receive the plates 31 with downward and forward movement of the rear portion of the seat.

The upper surface of the seat 10 may be provided with a coating of friction material 36 to prevent an occupant of a seat being thrown forwardly from the seat.

Operation

With the crash or collision seat mounted as illustrated and described, the seat is adapted to be used in the conventional manner and should the vehicle make a sudden stop, such as in a collision or crash the seat is moved forwardly with a rolling action, the combination of the hinged plates 12 and 24 changing the direct thrust into a curve and with the forward edge of the seat moving upwardly and the rear portion forwardly and downwardly. By this means the seat stops with a banking action and with the forward edge moving upwardly there is very little possibility of a person in the seat being thrown forwardly against the windshield, steering wheel or the like.

It will be understood that modifications, within the scope of the appended claims, may be made in the design and arrangement of the parts without departing from the spirit of the invention.

What is claimed is:

1. A vehicle seat comprising a bottom, a back integral with the bottom and positioned substantially at a right angle to the bottom, a floor upon which the seat is positioned, a support positioned at the back of the seat, a hinge connecting the lower edge of the support to the floor, a hinge connecting the upper edge of the support to the lower surface of the bottom of the seat, a support having a latching element on the upper edge positioned below the forward edge of the bottom and releasably connected to the bottom, and an inclined brace positioned below the seat with the leading end pivotally connected to the floor and the trailing end pivotally connected to the lower surface of the bottom of the seat, whereby upon sudden stopping of the floor the seat is thrown forwardly with the latching element at the forward edge separating and with the forward edge of the seat being moved upwardly by the brace and the rear edge downwardly by the support.

2. A vehicle seat comprising a bottom, a back integral with the bottom and positioned substantially at a right angle to the bottom, a floor upon which the seat is positioned, a support positioned at the back of the seat, a hinge connecting the lower edge of the support to the floor, a hinge connecting the upper edge of the support to the lower surface of the bottom of the seat, a support having a latching element on the upper edge positioned below the forward edge of the bottom and releasably connected to the bottom, an inclined brace positioned below the seat with the leading end pivotally connected to the floor and the trailing end pivotally connected to the lower surface of the bottom of the seat, and resilient means for receiving the rear surface of the bottom of the seat upon forward movement of the seat, whereby upon sudden stopping of the floor the seat is thrown forwardly with the latching element at the forward edge separating and with the forward edge of the seat being moved upwardly by the brace and the rear edge downwardly by the support.

3. A vehicle seat comprising a bottom, a back integral with the bottom and positioned substantially at a right angle to the bottom, a floor upon which the seat is positioned, a support positioned at the back of the seat, a hinge connecting the lower edge of the support to the floor, a hinge connecting the upper edge of the support to the lower surface of the bottom of the seat, springs mounted on the floor and positioned to receive the rear edge of the bottom of the seat in the forward movement thereof, a support having a latching element on the upper edge positioned below the forward edge of the bottom and releasably connected to the bottom, and an inclined brace positioned below the seat with the leading end pivotally connected to the floor and the trailing end pivotally connected to the lower surface of the bottom of the seat, whereby upon sudden stopping of the floor the seat is thrown forwardly with the latching element at the forward edge separating and with the forward edge of the seat being moved upwardly by the brace and the rear edge downwardly by the support.

4. In a safety device, the combination which comprises a seat, a back integral with the bottom and positioned substantially at a right angle to the bottom extended upwardly from the rear edge of the seat, a floor above which the seat is positioned, a continuous plate positioned between the rear edge of the seat and floor, means hingedly connecting the upper edge of the plate to the rear edge of the seat, means hingedly connecting the lower edge of the plate to the floor, a support having spring latching elements on the upper edge positioned on the floor and positioned below the forward edge of the seat, a latching element depending from the forward edge of the seat and positioned to coact with the latching elements of the support for retaining the seat in a horizontal position, a brace pivotally mounted on the floor and positioned with the extended end pivotally connected to the lower surface of the seat, and resilient means mounted on the floor and positioned to receive the lower portion of the rear of the seat, whereby upon sudden stopping of the floor the seat is thrown forwardly with the latching element at the forward edge separating and with the forward edge of the seat being moved upwardly by the brace and the rear edge downwardly by the support.

5. In a safety device, the combination which comprises a seat having a back, a support positioned between the lower surface of the seat and a floor upon which the seat is positioned, means for hinging the lower edge of the support to the floor, means for hinging the upper edge of the support to the rear edge of the seat, springs mounted on the floor and positioned to receive the rear edge of the seat, a support having spaced spring clips on the upper edge also adapted to be mounted on the floor and positioned below the forward edge of the seat, a latching element mounted on the seat and positioned to be temporarily retained between the spring clips for holding the seat in a horizontal position, and an inclined brace pivotally mounted on the floor and pivotally connected to the lower surface of the seat at a point intermediate of the forward and rear edges thereof and adapted to travel upwardly as it is moved forwardly and said support below the rear edge of the seat being adapted to swing downwardly as the seat is moved forwardly by momentum resulting from sudden stopping of the floor upon which the seat is positioned whereby upon sudden stopping of the floor the seat is thrown forwardly with the latching element at the forward edge separating and with the forward edge of the seat being moved upwardly by the brace and the rear edge downwardly by the support.

References Cited in the file of this patent
FOREIGN PATENTS

| | | |
|---|---|---|
| 814,708 | Germany | Sept. 24, 1951 |
| 830,902 | Germany | Feb. 7, 1952 |